(12) United States Patent
Clevenger (10) Patent No.: US 9,827,153 B2
(45) Date of Patent: Nov. 28, 2017

(54) PERSONAL WHEELCHAIR MOTORIZED VEHICLE SYSTEM

(71) Applicant: Michael Douglas Clevenger, Fargo, ND (US)

(72) Inventor: Michael Douglas Clevenger, Fargo, ND (US)

(*) Notice: Subject to any disclaimer, the term of this patent is extended or adjusted under 35 U.S.C. 154(b) by 0 days.

(21) Appl. No.: 15/397,020

(22) Filed: Jan. 3, 2017

(65) Prior Publication Data

US 2017/0296405 A1 Oct. 19, 2017

Related U.S. Application Data

(63) Continuation-in-part of application No. 15/131,874, filed on Apr. 18, 2016, now abandoned.

(51) Int. Cl.
| | |
|---|---|
| *B60P 3/06* | (2006.01) |
| *A61G 3/06* | (2006.01) |
| *B60R 21/13* | (2006.01) |
| *B60N 2/005* | (2006.01) |
| *B60K 28/02* | (2006.01) |

(Continued)

(52) U.S. Cl.
CPC ............ *A61G 3/066* (2013.01); *A61G 3/061* (2013.01); *A61G 3/0808* (2013.01); *B60K 28/02* (2013.01); *B60K 31/00* (2013.01); *B60N 2/005* (2013.01); *B60P 1/435* (2013.01); *B60R 21/13* (2013.01); *B60K 2031/0091* (2013.01); *B60R 2021/0011* (2013.01); *B60R 2021/0018* (2013.01); *B60R 2021/137* (2013.01); *B60Y 2200/16* (2013.01); *B60Y 2306/01* (2013.01)

(58) Field of Classification Search
CPC .... B60P 1/43; B60P 1/433; B60P 3/06; B60P 1/435; A61G 3/066; A61G 3/061; A61G 3/0808; A61G 3/06; A61G 3/062; A61G 3/063; A61G 3/065; B60K 28/02; B60K 31/00; B60K 2031/0091; B60N 2/005; B60R 2021/0011; B60R 2021/0018; B60R 2021/137; B60R 21/13; B60Y 2200/16; B60Y 2306/01
USPC ................................ 414/480, 537; 280/43.1
See application file for complete search history.

(56) References Cited

U.S. PATENT DOCUMENTS 3,874,527 A * 4/1975 Royce .................... A61G 3/061
14/71.1
3,921,740 A * 11/1975 Forster .................... A61G 3/061
180/213

(Continued)

*Primary Examiner* — William Gilbert
(74) *Attorney, Agent, or Firm* — The Keith Miller Law Group; Keith Miller (57) ABSTRACT

A motor vehicle for independent use by an individual in a wheelchair, comprising an open air vehicle body including a floor further comprising a front, a rear, and lateral sides, said floor sized and shaped to receive and retain a wheelchair; a motor; at least one front and at least one rear wheel supporting said vehicle body and floor, each of said front and rear wheels attached rotatably near an underside of a corner of the vehicle body; at least one actuator attaching said floor to said at least one rear wheel, wherein said floor can be lowered to a ground surface and raised to a level floor position; wherein a rear portion of said floor is structured to fold upward to form said rear side and fold downward to be in line with said floor; and a steering control assembly coupled to said at least one front wheel.

12 Claims, 5 Drawing Sheets

(51) Int. Cl.
    *B60K 31/00*    (2006.01)
    *B60P 1/43*    (2006.01)
    *A61G 3/08*    (2006.01)
    *B60R 21/00*    (2006.01)

(56) References Cited

U.S. PATENT DOCUMENTS

| | | | | |
|---|---|---|---|---|
| 5,094,314 | A * | 3/1992 | Hayata | A61G 3/065 180/217 |
| 5,305,845 | A * | 4/1994 | Van Dooren | A61G 3/065 180/65.1 |
| 6,305,897 | B1 * | 10/2001 | Budd | B60P 1/02 414/540 |
| 6,340,280 | B1 * | 1/2002 | Mollick | A61G 3/061 414/537 |
| 2003/0044266 | A1 * | 3/2003 | Vandillen | A61G 3/061 414/537 |
| 2005/0012353 | A1 * | 1/2005 | Winter | B60P 3/34 296/26.08 |
| 2006/0052909 | A1 * | 3/2006 | Cherouny | B60K 28/063 701/1 |

* cited by examiner

FIG. 5

PERSONAL WHEELCHAIR MOTORIZED VEHICLE SYSTEM

CROSS-REFERENCE TO RELATED APPLICATIONS

This application is a Continuation-in-Part of application Ser. No. 15/131,874, originally filed Apr. 18, 2016, entitled "VEHICLE FOR PERSONAL MOBILITY OF AN INDIVIDUAL IN A WHEELCHAIR", the contents all of which are incorporated herein by this reference and are not admitted to be prior art with respect to the present invention by the mention in this cross-reference section.

FIELD OF THE INVENTION

The present invention relates generally to a personal motorized vehicle that is wheelchair accessible, and more specifically to an independently operated personal wheelchair motorized vehicle designed to be accessed and operated by an individual in a wheelchair.

BRIEF SUMMARY OF THE INVENTION

The present invention discloses a motorized vehicle to provide independent mobility for an individual confined to using a wheelchair or other mobility devices, such as walkers or scooters. In particular, the vehicle provides a user friendly, convenient, and safe vehicle for independent transportation of an individual in a wheelchair.

The present invention describes a motorized vehicle which has a vehicle body with a floor configured to receive and secure a wheelchair on it in the place of the driver. The rear of the floor at the rear of the vehicle can be lowered with actuators attaching the floor to the wheels to allow an individual to easily access the vehicle, either by driving a wheelchair or walking onto the floor. Additionally, the rear of the floor has a section that folds up when not in use forming the rear side of the vehicle. When accessing the vehicle, the rear floor section folds downward as part of the floor and ramp. Lowering, and folding down, of the rear of the floor forms a gentle incline over the length of the floor, from the front of the floor to the rear of the floor, to provide an easily accessed incline. After an individual has accessed the floor, it is raised to a level position and the rear section is folded upwards into a locked position forming the rear side of the vehicle. The inside front of the vehicle has a steering control assembly with hand operated controls for steering, throttle, and braking. The vehicle has additional hand operated controls for lights, turn signal lights, and horn, each of which may also be configured on the steering control assembly. To ensure safety of a wheelchair occupant, the vehicle has a locking device for securing a wheelchair in the vehicle. The locking device secures the wheelchair in a position to provide access to the steering control assembly by an occupant seated in the wheelchair. A safety switch is coupled to the locking device and is activated when a wheelchair is locked to the device and secured in the vehicle. Activation of the safety switch is required for operation of the vehicle, including starting and running of the motor, and controlling the throttle.

DETAILED DESCRIPTION

While the present technology is capable of various embodiments, there is shown in the drawings and described in detail specific embodiments with the understanding that the present disclosure exemplifies the principles of the technology and is not intended to limit the technology to the embodiments illustrated. It will be understood that like or analogous elements and/or components, referred to herein, may be identified throughout the drawings with like reference characters.

Figure 1:
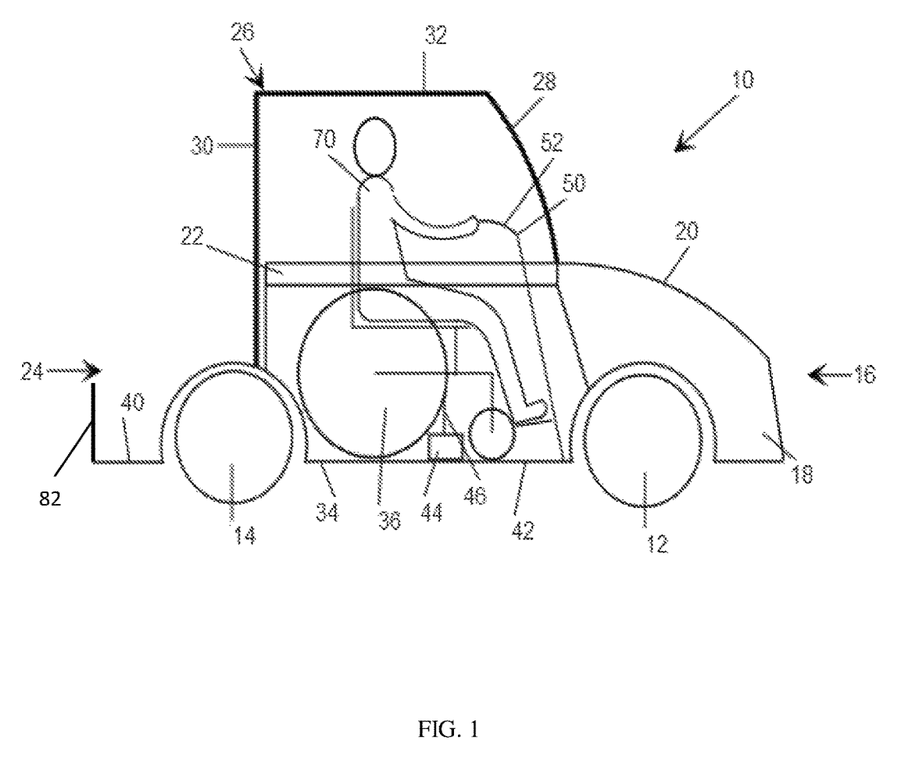
FIG. 1 is a side view of a Personalized Wheelchair Motorized Vehicle System according to a preferred embodiment of the present invention.

Referring now to FIG. 1, the invention described herein is preferably an open-sided vehicle 10 comprising a front side, a rear side, and two lateral sides that include a left side and a right side, relative to facing the front of the vehicle. The terminology "open-sided vehicle" refers to a vehicle that is at least partially open to the air on at least two sides of the vehicle at all times, such that an occupant in the vehicle 10 is not fully enclosed on all sides of the vehicle by panels and/or windows. Advantages of the open-sided vehicle include avoiding making some users claustrophobic, and providing a vehicle that can be used both outdoors and indoors in large spaces, such as in a shopping mall or airport.

As shown in FIG. 1, the motor vehicle is a four-wheeled vehicle having a vehicle body carried on a frame or chassis supported preferably by two front wheels 12 and two rear wheels 14. The front and rear wheels are attached rotatably near the underside of each corner of the vehicle. In an alternative embodiment, the vehicle has two front wheels and one rear wheel that is centered between the lateral sides of the vehicle (not shown). In another alternative embodiment, the vehicle has one front wheel and two rear wheels. The front wheel, or wheels are preferably steerable, and the steering is controlled by a steering control assembly, as described below. In a preferred embodiment, the vehicle has front wheel drive. Alternately preferably, the vehicle may be rear wheel drive.

The open-sided vehicle 10 has a front side 16 that is open above the top of the hood 20 of a front compartment 18, lateral sides that that are primarily open and have side safety panels or bars 22, and a rear side 24 that is primarily open. An open-sided vehicle as presently disclosed may optionally include a roll cage 26 or similar safety structure in the vehicle body that would protect a user of the vehicle in the unlikely event of rolling the vehicle on its side or upside down.

Figure 2:
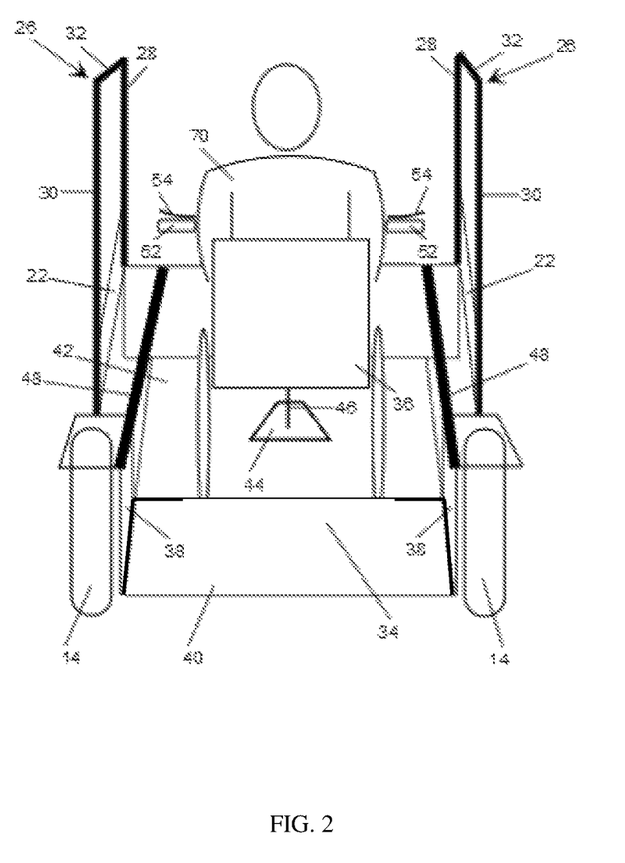
FIG. 2 is a rear view of a Personalized Wheelchair Motorized Vehicle System according to a preferred embodiment of the present invention when the rear of the vehicle floor is raised to a level position.
Figure 3:
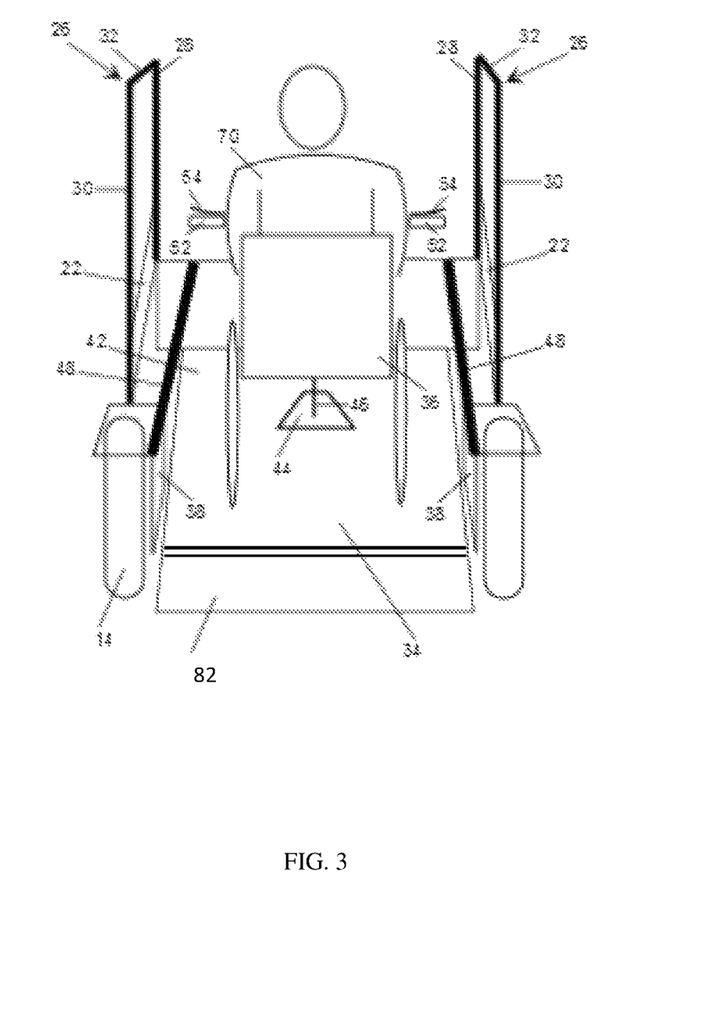
FIG. 3 is a rear view of a Personalized Wheelchair Motorized Vehicle System according to a preferred embodiment of the present invention when the rear of the vehicle floor is lowered to a surface.

As shown in FIGS. 1-3, a roll cage 26 can be configured from contiguous tubing on each of the lateral sides of the vehicle, in which the tubing includes a front vertical or primarily vertically oriented member 28, a rear vertical or primarily vertically oriented member 30, and a horizontal or primarily horizontally oriented member 32 that lies between and connects the front and rear vertical members. In an alternative embodiment, a roll cage could include cross members that connect across and lie between the top of the roll cage 26 such that the two lateral sides of the roll cage are rigidly connected across the top to form a four sided, open structure across the top of the roll cage (not shown).

An open-sided vehicle 10 as disclosed herein will preferably further include a front windshield and/or a roof. Preferably, the front windshield will be comprised of safety glass material. In this respect, an open-sided vehicle could remain primarily open on the lateral and rear sides of the vehicle, with a closed front and/or closed top. In one embodiment, a front windshield is placed between the vertical front members 28 of a roll cage 26. Likewise, a roof is placed over and between the horizontal members 32 of a roll cage.

As shown in FIGS. 2 & 3, the floor 34 of the motor vehicle body is sized to receive a wheelchair 36. The floor 34 is therefore long enough to readily support a wheelchair from the front to the rear of the wheelchair 36, and to adequately allow a wheelchair to be rolled onto the floor and positioned to operate the vehicle. The width of the floor 34 between the lateral sides of the vehicle, and particularly between the inner lateral sides 38 of the rear wheels, is amply sized to allow wheelchairs of varying widths to fit between the lateral sides of the vehicle. In this regard, the vehicle is sized to accept different sized wheelchairs, both with respect to the length of the wheelchair from front to rear, and the width of the wheelchair.

As shown in FIG. 3, the rear 40 of the floor 34 can be lowered to a ground surface, such as pavement, or to a sidewalk that the vehicle is adjacent to, that the vehicle rests on when the vehicle is not in motion to allow access to the floor 34 by a wheelchair. The lowering of the rear 40 of the floor 34 involves folding a portion of the rear of the floor downwards and activating the actuators attaching the rear of the floor to the rear wheels, and creates a gentle incline between the front 42 of the floor and the rear 40 of the floor. This gentle incline enables a wheelchair to be easily rolled onto the floor and into the driver's position, and also enables the floor to be easily walked up and onto for an individual not confined to a wheelchair.

As further shown in FIG. 2, after the floor 34 of the vehicle has been accessed by an individual, the floor 34 can be raised to a level position, and the rear portion folded upwards to form the rear side of the vehicle, to allow operation of the vehicle. Lowering of the floor likewise allows easy and convenient egress from the vehicle after use.

Figure 4A:
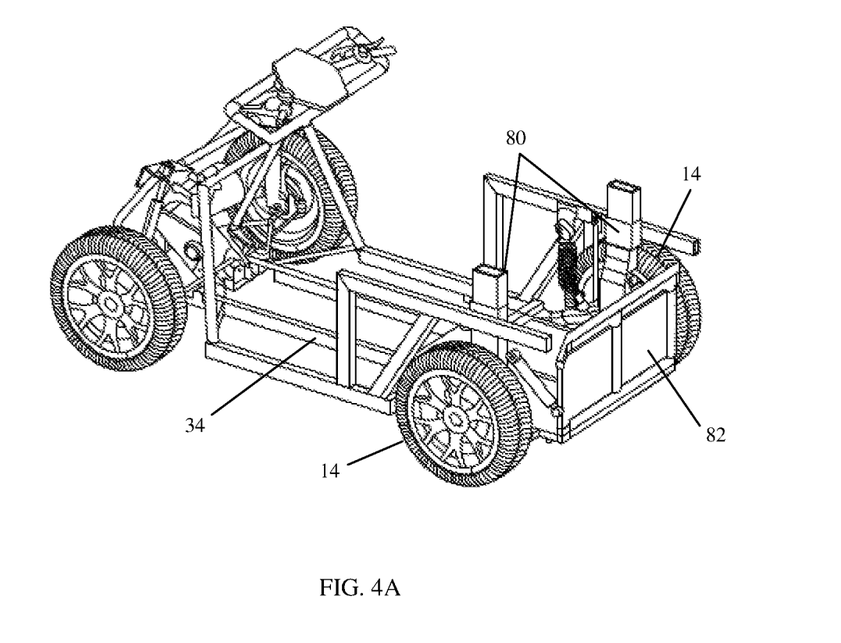
FIGS. 4A, 4B, and 4C are perspective side views of a frame of a Personal Wheelchair Motorized Vehicle System according to a preferred embodiment of the present invention showing the attachment of the vehicle floor to the wheels and a rear folding ramp section.
Figure 4B:
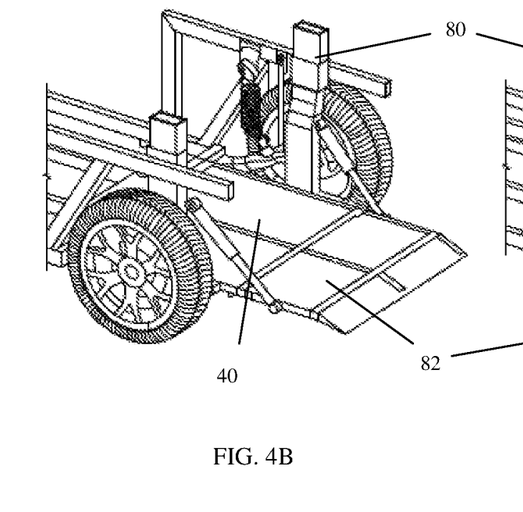
Figure 4C:
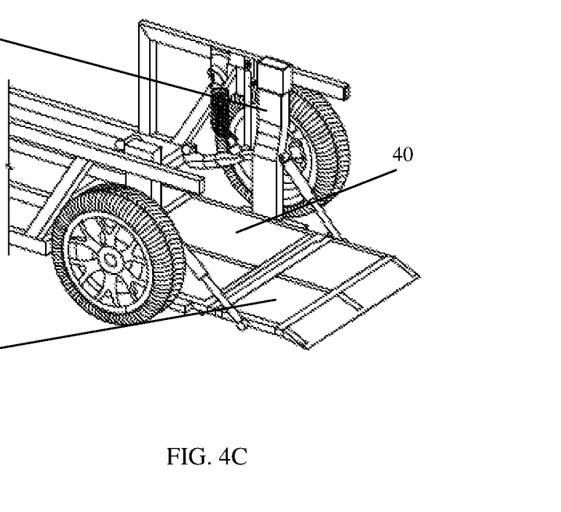

As shown in FIGS. 4A, 4B, and 4C, the floor 34 of the vehicle is attached to the rear wheels via actuators 80 which allow the floor 34, or a section of the floor 34, to be raised or lowered as desired to the surface the vehicle is resting on. Additionally, the floor of the vehicle further comprises a rear portion 82 that folds upward to provide the rear side of the vehicle after the floor has been raised to a level position. The rear portion 82 of the floor will also fold down when accessing the vehicle to provide a transition surface to the floor.

FIG. 4A shows the floor 34 in the raised level position with the rear portion 82 of the floor folded upward to form the rear side of the vehicle. The rear portion 82 of the floor in the folded upward position also provides protection to the user in the case of a collision from the rear of the vehicle. The rear portion 82 also provides a secondary barrier to prevent the wheelchair from rolling backwards and off the floor of the vehicle in the case where the locking device fails.

Further, FIG. 4B shows the rear portion 82 folded downward to be in line with the floor, and the floor ready to be lowered by the actuators 80. FIG. 4C shows the rear portion 82 of the floor 34 folded downward and the floor 34 lowered according to a preferred embodiment of the present invention to allow an individual in a wheelchair to access the vehicle. Once the individual is in place in the vehicle, the floor is raised and the rear portion is folded upward.

In one embodiment, as shown in FIG. 3, the floor 34 will be configured such that the entire floor is lowered to the ground surface that the vehicle rests on, and the rear portion of the floor folds down to provide an access ramp. In an alternate embodiment, the rear of the floor will be lowered to the ground surface forming an incline over the length of the floor, sloping from the front 42 of the floor 34 to the rear 40 of the floor 34. Alternately preferably, the floor 34 will be configured such that only a portion of the floor 34 slopes when the rear 40 of the floor 34 is lowered to the surface that the vehicle rests on. For example, the portion of the floor 34 that slopes when the rear 40 of the floor 34 is lowered to the ground surface may be any of a range of portions from the rear of the floor 34 toward the front 42 of the floor 34 including, but not limited to, the rear 40 one-quarter, one-third, one-half, two-thirds, and three-quarters of the floor 34. In both embodiments, the rear portion of the floor will fold down to provide access to the floor, and fold up to form the rear side of the vehicle.

As further shown in FIGS. 4A, 4B, and 4C, in the preferred embodiment of an open-sided vehicle having four wheels, the floor 34 will be configured to allow the rear of the floor to lower between the rear wheels 14 and a rear portion 82 of the floor to fold down allowing a wheelchair access to the floor 34. For example, the floor 34 of the vehicle, in particular the rear of the floor 40, can be supported by a portion of the vehicle's chassis or frame that is independent of portions of the vehicle's chassis or frame that support the portions of the vehicle body that surrounds each of the rear wheels.

In an alternative embodiment of an open-sided vehicle, the vehicle may have a single rear wheel that is centered between the lateral sides of the vehicle. In this embodiment, the floor could be configured to have a cut out such that the floor of the vehicle passes around the rear wheel. The cut out in the floor allows the rear wheel to rotate and also allows the rear of the floor to lower around the rear wheel. In this configuration, a wheelchair can be rolled onto the floor by straddling over the rear wheel while being rolled toward the front of the vehicle. In one embodiment, the rear wheel can be positioned on the vehicle such that its axis aligns with the end of the floor. In this configuration, the rear of the floor would have a "U" shape that passes around the rear wheel.

As further shown in FIGS. 4A, 4B, and 4C, one or more actuators 80 are used for lowering and raising the rear 40 of the floor 34. The one or more actuators 80 attach the floor of the vehicle 34 to at least one of the rear wheels, and the actuators 80 are positioned to lower and raise the rear 40 of the floor. In this aspect, the actuator 80 may be positioned beneath the floor 34, to the side of the floor, and/or above the floor, and attached to the underside, side and/or top of the floor.

The actuator 80 may be configured or engineered in any of a number of commonly applied mechanisms to lower and raise the floor, and may include but not be limited to a pneumatic, hydraulic, electric, mechanical, electromechanical, linear motor, and telescoping linear actuator. For example, the actuator 80 might be configured as a linear actuator having a hydraulic cylinder that has a piston that extends to lower the rear of the floor and retracts to raise the rear of the floor. Likewise, the actuator 80 might be an electromechanical device in which an electric motor moves structural components, such as gears and rails or pulleys and chains, to lower and raise the rear of the floor 40.

The actuator 80 may be controlled by any of a number of different controllers including, but not limited to, a handle on the vehicle, a switch or button on the vehicle, a key for which there is a keyhole on the vehicle, and a remote control. Preferably, a controller for the actuator is readily accessible by an individual confined to a wheelchair or other mobility device. The vehicle could include one or more actuator controllers, such as having one controller at the rear of the vehicle and one at the front of the vehicle. A remote control for the actuator could take any of a number of forms or devices including, but not limited to, a remote on a key fob, a remote that is mounted on a wheelchair, a remote that can be controlled through a hand-held device such as a cell phone, and so on.

In another alternative embodiment, the vehicle may contain one or more ramps that are extendable from the rear of the floor 40 to the ground surface when the rear of the floor 40 is first lowered toward the ground surface. An extendable ramp provides additional length beyond that of the floor 34, and effectively bridges a gap that might occur between the rear of the vehicle and the ground surface. Accordingly, the additional length offered by the extendable ramp may allow access to the vehicle from a point beyond that of the rear of the vehicle. The extendable ramp will preferably be retractable when the floor 34 is raised level or just prior to raising the floor 34 level. The extendable ramp will preferably have a configuration in which the ramp is stored beneath and parallel to the floor. In this configuration, the extendable ramp will linearly extend from the rear of the vehicle when in use and linearly retract when not in use. Extension and retraction of the extendable ramp can be carried by an actuator, in a fashion similar to use of the actuator for the lowering and raising of the rear of the floor. An actuator for the ramp could be controlled by different types of controllers, as described above for the actuator used to lower and raise the rear of the floor.

To help ensure user safety, the vehicle 10 includes a locking device or mechanism for securing a wheelchair 36 in the vehicle in a position that allows an individual 70 in a wheelchair to access hand operable controls and to operate the vehicle. The locking device could take any of a number of different forms including, but not limited to, a device 44 located on the floor that engages and secures a wheelchair 36. For example, the locking device could be a floor docking system comparable to the EZ Lock wheelchair docking system (EZ Lock Inc., Baton Rouge, La., USA), in which a floor mounted base 44 locks an interfacing bracket 46 that is mounted on a wheelchair 36. In addition to a locking device that secures a wheelchair, the vehicle may also include a seatbelt system for an individual 70 in a wheelchair 36. For example, the vehicle may have a three-point seat belt configured to buckle across an individual 70 in a wheelchair 36 once the wheelchair 36 is secured in the vehicle 10.

Safety of the vehicle is further enhanced by a safety switch that is coupled to the locking device. The safety switch is activated or turned on when a wheelchair is secured on the vehicle floor by the locking device. Activation of the safety switch is required for operation of the vehicle, including starting of the motor and running of the motor after it is started. Accordingly, the motor will not run if the safety switch is not activated or turned off.

To further provide ease of access and safety for a wheelchair user 70, the vehicle includes side rails 48 with grab handles. The side rails are mounted along the interior lateral sides of the vehicle above the floor, and in one embodiment are horizontal to the floor. The side rails have a length and height that allow a wheelchair user to readily grab the handles of the side rails. The side rails may extend from the front of the floor to the rear of the floor, or be of a length that extends over a portion of the floor. The side rails thereby provide safety handles that an individual in a wheelchair may grab while entering or exiting the vehicle.

In one embodiment the side rails may structurally contribute to the strength and integrity of the vehicle body, thereby improving the vehicle body's structure with respect to protecting an occupant in the event of an accident or crash. The side rails therefore may have a structure that is strong enough and/or reinforced to provide additional strength to the vehicle body. For example, the side rails could be configured from solid bar material or high impact-resistant tubing that also could be internally reinforced with cross-members. Accordingly, the side rails may improve the safety of the vehicle in the event of an accident or crash.

A steering control assembly 50 coupled to the steerable front wheels 14 is mounted at the front of the vehicle 10, projecting above the front 42 of the vehicle floor 34. The steering control assembly 50 includes hand operated controls and is positioned for access and use by an individual 70 seated in a wheelchair 36. The steering control assembly includes hand operable steering, throttle, and braking controls. In the preferred embodiment of the vehicle, the steering control assembly has handlebars 52 for steering the vehicle, with the hand operable controls for throttle and braking mounted on the handlebars. For example, the controls may include, but are not limited to, a throttle that is controlled by rotating a hand grip (such as commonly found on a motorcycle), a throttle lever such as a thumb or finger operated lever or paddle, and braking control levers, such as braking levers 54 that are positioned in front of the handlebar end grips and pulled toward the handlebar for applying the brakes (similar to those brake levers commonly found on a motorcycle or bicycle).

The vehicle will preferably have headlights, tail lights, signal lights, and a horn. When so configured, the vehicle will accordingly include hand operable controls for the headlights, tail lights, signal lights, and horn. These controls may likewise be mounted on the steering control assembly, and may be included on handlebars that are preferably used for steering the vehicle.

The motor of the vehicle will preferably be an electric motor. Alternately preferably, the vehicle may be powered by a gasoline engine or a hybrid electric-gasoline engine.

In a preferred embodiment, the motor vehicle will include a programmable controller for regulation of maximum speed of the vehicle. The programmable controller can be adjusted for one or more particular uses of the vehicle. For example, an open-sided vehicle may be desirably used in a large indoor setting, such as a shopping mall or airport. In this scenario, the programmable controller could be set to regulate top speed to a maximum of 3 miles per hour. For use of an open-sided vehicle on outdoor paths, in theme parks, local, regional and national parks, and so forth, the programmable controller could be programmed to allow the vehicle to reach maximum speeds between 8 to 13 miles per hour. The programmable controller can also be programmed for to allow the vehicle to reach a maximum speed between 20 to 25 miles per hour, commensurate with a vehicle that meets transportation regulations as a low speed vehicle for legal use on streets.

As described above, the open-sided vehicle is designed to provide transportation to an individual in a wheelchair. However, the vehicle may include a detachable seat that can be installed to allow use of the vehicle by an individual who is not confined to a wheelchair. The detachable seat can be configured to activate the safety switch when the detachable seat is installed in the vehicle, to allow operation of the vehicle. For example, the detachable seat may have a bracket or similar part that fits into the wheelchair locking device, such that the installation of the detachable seat includes the seat being secured to the locking device. For additional safety of a user of the detachable seat, the seat or the vehicle may include a seatbelt system, such as a three-point seatbelt. For example, the vehicle may have a three-point seat belt configured to buckle across an individual in the detachable seat or an individual in a wheelchair.

Figure 5:
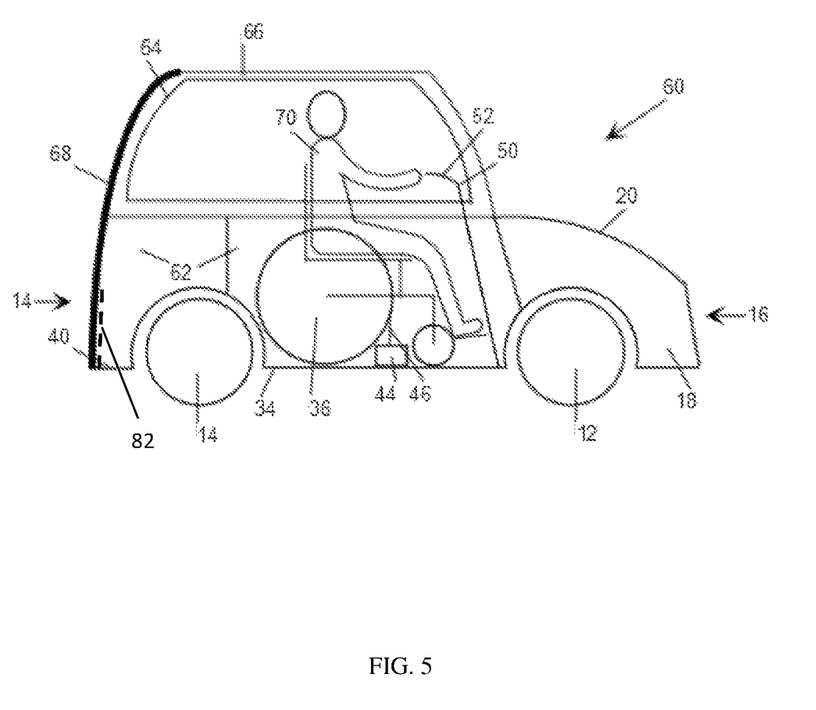
FIG. 5 is a side view of an enclosed vehicle of a Personal Wheelchair Motorized Vehicle System according to an alternate embodiment of the present invention.

In an alternative preferred embodiment, as shown in FIG. 5, a motor vehicle as disclosed herein will be an enclosed, four wheeled vehicle 60 for independent transportation of an individual 70 confined to using a wheelchair 36 or other mobility device, as shown in FIG. 5. The enclosed vehicle embodiment has all of the operational features and components of the open-sided vehicle 10 as described above including, but not limited to, an actuator for lowering and raising the rear 40 of the floor 34, a rear portion of the floor that folds up to form a rear side of the vehicle, a steering control assembly 50 with handlebars 52 for steering and hand operable controls, side rails with grab handles, a locking device 44 for securing a wheelchair 36 to the floor 34, and a safety switch that is coupled to the locking device, with activation of the safety switch required for operation of the vehicle. The enclosed vehicle has additional features and components as described below. The enclosed vehicle has an enclosed passenger compartment and a structure that generally is similar to that of a typical automobile, including a front windshield, side panels 62 and windows 64, a rear window, and a roof 66.

The width of the floor between the lateral sides of the enclosed vehicle, and particularly between the inner lateral sides of the rear wheels, is amply sized to allow wheelchairs of varying widths to fit between the lateral sides of the vehicle. In this regard, the vehicle is sized to accept different sized wheelchairs, both with respect to the length of the wheelchair from front to rear, and the width of the wheelchair.

As further shown in FIG. 5, the enclosed vehicle 60 is accessed from the rear through a rear door 68 and the rear folding portion of the floor. In one embodiment, the vehicle has a single opening hatchback door 68 that lifts up from the vehicle. Alternatively, the vehicle may have a single door that opens to the side of the vehicle, or two doors that close against each other in the middle of the rear of the vehicle and open to opposite lateral sides of the vehicle. The rear door 68 will include a rear window for visibility out the rear of the vehicle 60.

Opening and closing of the rear door may be controlled by any of a number of different controllers including, but not limited to, a switch or button on the vehicle, a key for which there is a keyhole on the vehicle, and a remote control. Preferably, a controller for the rear door is readily accessible by an individual confined to a wheelchair or other mobility device. The vehicle could include one or more door controllers, such as having one controller at the rear of the vehicle and one at the front of the vehicle. A remote control for the door could take any of a number of forms or devices including, but not limited to, a remote on a key fob, a remote that is mounted on a wheelchair, a remote that can be controlled through a hand-held device such as a cell phone, and so on. The door controller can be coupled with the controller for the actuator that lowers the rear of the floor. Furthermore, the door and actuator controllers can be coupled with the controller for the vehicle's ignition. For example, the controllers for the vehicle's ignition, door, and actuator could all be contained on a key fob.

While the rear door 68 is being opened or after the rear door 68 has been opened, the rear 40 of the floor 34 can be lowered to the ground surface, such as pavement, that the vehicle 60 rests on and the rear portion of the floor lowered. The structure of the rear 40 of the floor 34 and operation of its lowering is as described above for an open-sided vehicle. The vehicle may also have one or more extendable ramps, as described above. The extendable ramp is extendable and retractable while the rear door 68 is open. After the vehicle has been accessed by an individual, the floor 34 is raised to a level position and the rear portion of the floor is folded upwards, to allow operation of the vehicle 60. Once the floor 34 is raised to a level position (and a ramp, if present, is retracted) and the rear portion folded upwards, the user may close the rear door 68 to enclose the vehicle.

To help ensure user safety, the enclosed vehicle preferably includes a locking device 44 for securing a wheelchair 36 in the vehicle 60 in a position that allows an individual in a wheelchair 36 to access hand operable controls and to operate the vehicle, as described above. In addition to a locking device 44 that secures a wheelchair 36, the vehicle also preferably includes a seatbelt system for an individual in a wheelchair, such as a three-point seat belt configured to buckle across an individual in a wheelchair once the wheelchair is secured in the vehicle. A safety switch is coupled to the locking device, and activation of the safety switch is required for operation of the vehicle, as described above for the open-sided vehicle.

The side rails of the enclosed vehicle are mounted similarly to those described above for the open-sided vehicle. Likewise, the side rails may structurally contribute to the strength and integrity of the vehicle body, thereby improving the vehicle body's structure with respect to protecting an occupant in the event of an accident or crash. Accordingly, the side rails may improve the safety of the vehicle in the event of an accident or crash.

The enclosed vehicle is designed to provide transportation to an individual in a wheelchair. However, the enclosed vehicle may include a detachable seat that can be installed to allow use of the vehicle by an individual who is not confined to a wheelchair, as described above for the open-sided vehicle. The seat or the vehicle will include a seatbelt system, such as a three-point seatbelt. For example, the vehicle may have a three-point seat belt configured to buckle across an individual in the detachable seat or an individual in a wheelchair.

The enclosed vehicle will preferably have an electric motor. The vehicle may also include a programmable controller for regulation of maximum speed of the vehicle. In one embodiment, the programmable controller can be programmed for to allow the vehicle to reach a maximum speed between 20 to 25 miles per hour, commensurate with a vehicle that meets transportation regulations as a low speed vehicle for legal use on streets.

While the presently disclosed motorized vehicle has been described as having particular configurations disclosed herein, the present technology can be further modified within the spirit and scope of this disclosure. This application is therefore intended to cover any variations, uses, or adaptations of the technology using its general principles. Further, this application is intended to cover such departures from the present disclosure as come within known or customary practice in the art to which this technology pertains and which fall within the limits of the appended claims.

What is claimed is:

1. A motor vehicle comprising:
an open air vehicle body including a floor further comprising a front, a rear, and lateral sides, said floor sized and shaped to receive and retain a wheelchair;
a motor configured and arranged to propel said motor vehicle;
at least one front and at least one rear wheel supporting said vehicle body and floor, each of said front and rear wheels attached rotatably near an underside of a respective corner of the vehicle body;
said floor further comprising a plurality of floor sections, wherein at least one front section of said floor sections is arranged and configured to be attached to said vehicle body, and at least one rear floor section of said floor sections is arranged and configured to be lowered to the ground and be in line with said at least one front section, and where at least one of said at least one rear floor section of said floor sections is arranged and configured to be raised to form the rear of the vehicle, wherein said at least one rear floor section arranged and configured to be raised to form the rear of the vehicle is further arranged and configured to provide rear collision protection to a vehicle operator;
a plurality of side rails with grab handles, said plurality of side rails being substantially parallel and on opposite lateral sides of said vehicle body above the floor, wherein said side rails are arranged and configured to provide side collision protection to the vehicle operator;
at least one actuator attaching said floor to said at least one rear wheel, wherein said floor can be lowered to a ground surface and raised to a level floor position; and
a steering control assembly coupled to said at least one front wheel,
a safety switch coupled to a locking device, wherein said safety switch is activated when a wheelchair is secured by said locking device, wherein activation of said safety switch is required to activate an ignition switch, wherein said ignition switch must be placed in an on position to operate the vehicle.

2. The motor vehicle of claim 1, further comprising at least one extendable ramp structured and arranged to longitudinally extend outward from a rear of said floor to said surface when said rear of said floor is lowered to said surface, wherein said at least one extendable ramp further comprises said at least one rear floor section.

3. The motor vehicle of claim 1, wherein said vehicle body further comprises a roll cage.

4. The motor vehicle of claim 3, said roll cage having tubing on each of said vehicle body's lateral sides, wherein said tubing on each lateral side has a contiguous configuration that includes a front vertical member, a rear vertical member, and a horizontal member that lies between said front and said rear vertical members.

5. The motor vehicle of claim 1, wherein said floor has a width and length sized to receive and retain various widths and lengths of a wheelchair.

6. The motor vehicle of claim 1, further comprising a detachable seat for use of said vehicle by an individual who is not in a wheelchair.

7. The motor vehicle of claim 1, further comprising a three point seatbelt.

8. The motor vehicle of claim 1, wherein said actuator is arranged and configured to be attached on top of the floor.

9. A motor vehicle comprising:
an enclosed vehicle body including an enclosed passenger compartment; and a floor further comprising a front, a rear, and lateral sides, said floor sized and shaped to receive and retain a wheelchair on it;
a windshield;
a rear window;
a plurality of side windows;
a motor configured and arranged to propel said motor vehicle;
a rear door;
said floor further comprising a plurality of floor sections, wherein at least one front section of said floor sections is arranged and configured to be attached to said vehicle body, and at least one of said at least one rear floor section of said floor sections is arranged and configured to be lowered to the ground and be in line with said at least one front section, and where at least one rear floor section of said floor sections is arranged and configured to be raised to form the rear of the vehicle, wherein said at least on rear floor section arranged and configured to be raised to form the rear of the vehicle is further arranged and configured to provide rear collision protection to a vehicle operator;
a plurality of side rails with grab handles, said plurality of side rails being substantially parallel and on opposite lateral sides of said vehicle body above the floor, wherein said side rails are arranged and configured to provide side collision protection to the vehicle operator;
at least one front and at least one rear wheel supporting said vehicle body and floor, each of said front and rear wheels attached rotatably near an underside of a respective corner of the vehicle body;
at least one actuator attaching said floor to said at least one rear wheel, wherein said floor can be lowered to a ground surface and raised to a level floor position;
a steering control assembly coupled to said at least one front wheel;
a safety switch coupled to a locking device, wherein said safety switch is activated when a wheelchair is secured by said locking device, wherein activation of said safety switch is required to activate an ignition switch, wherein said ignition switch must be placed in an on position to operate the vehicle.

10. The motor vehicle of claim 9, further comprising a detachable seat for use of said vehicle by an individual who is not in a wheelchair.

11. The motor vehicle of claim 9, wherein said floor has a width and length sized to receive and retain various widths and lengths of a wheelchair.

12. The motor vehicle of claim 9, further comprising at least one extendable ramp structured and arranged to longitudinally extend outward from a rear of said floor to said surface when said rear of said floor is lowered to said surface, wherein said at least one extendable ramp further comprises at least one rear section.

* * * * *